United States Patent
Taketomi et al.

(10) Patent No.: US 11,897,814 B2
(45) Date of Patent: Feb. 13, 2024

(54) RARE EARTH ALUMINATE SINTERED COMPACT AND METHOD FOR PRODUCING RARE EARTH ALUMINATE SINTERED COMPACT

(71) Applicant: NICHIA CORPORATION, Anan (JP)

(72) Inventors: Shozo Taketomi, Tokushima (JP); Ryo Yamamoto, Anan (JP); Tomomi Fujii, Anan (JP); Toshiyuki Hirai, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 67 days.

(21) Appl. No.: 17/444,422

(22) Filed: Aug. 4, 2021

(65) Prior Publication Data
US 2022/0041509 A1   Feb. 10, 2022

(30) Foreign Application Priority Data
Aug. 7, 2020 (JP) .................................. 2020-135121

(51) Int. Cl.
*C09K 11/77*   (2006.01)
*C04B 35/44*   (2006.01)
*C04B 38/00*   (2006.01)

(52) U.S. Cl.
CPC .......... *C04B 35/44* (2013.01); *C04B 38/0054* (2013.01); *C09K 11/7706* (2013.01); *C04B 2235/5463* (2013.01); *C04B 2235/74* (2013.01); *C04B 2235/785* (2013.01); *C04B 2235/786* (2013.01); *C04B 2235/80* (2013.01)

(58) Field of Classification Search
CPC . C09K 11/0838; C09K 11/7774; C09K 11/77; C09K 11/7792; C09K 11/7706; C09K 11/7721; C09K 11/7734; C09K 11/7749; C04B 35/10; C04B 35/115; C04B 35/117; C04B 35/44; C04B 2111/807; C04B 2235/77; C04B 2235/764; C04B 2235/782; C04B 2235/786; C04B 2235/785; C04B 2235/5418; C04B 2235/9646

See application file for complete search history.

(56) References Cited

U.S. PATENT DOCUMENTS 8,854,725 B2   10/2014   Hamada et al.
8,871,114 B2   10/2014   Miyagawa et al.
(Continued)

FOREIGN PATENT DOCUMENTS

JP   H05286762 A   11/1993
JP   H08268751 A   10/1996
(Continued)

OTHER PUBLICATIONS

Machine translation of JP2017197774A, 27 pages. (Year: 2017).*

*Primary Examiner* — Matthew E. Hoban
*Assistant Examiner* — Lynne Edmondson
(74) *Attorney, Agent, or Firm* — Hunton Andrews Kurth LLP

(57) ABSTRACT

A rare earth aluminate sintered compact including rare earth aluminate phosphor crystalline phases and voids, wherein an absolute maximum length of 90% or more by number of rare earth aluminate phosphor crystalline phases is in a range from 0.4 μm to 1.3 μm, and an absolute maximum length of 90% or more by number of voids is in a range from 0.1 μm to 1.2 μm.

14 Claims, 11 Drawing Sheets

(56) References Cited

U.S. PATENT DOCUMENTS

| | | |
|---|---|---|
| 8,922,111 B2 | 12/2014 | Zhang et al. |
| 9,133,392 B2 | 9/2015 | Raukas et al. |
| 9,567,518 B2 | 2/2017 | Miyagawa et al. |
| 10,240,086 B2 | 3/2019 | Raukas et al. |
| 2008/0269040 A1 | 10/2008 | Sugawara et al. |
| 2012/0018673 A1 | 1/2012 | Raukas et al. |
| 2013/0069007 A1 | 3/2013 | Miyagawa et al. |
| 2013/0234587 A1 | 9/2013 | Zhang et al. |
| 2014/0071683 A1 | 3/2014 | Hamada et al. |
| 2015/0008818 A1 | 1/2015 | Miyagawa et al. |
| 2015/0329778 A1 | 11/2015 | Menke et al. |
| 2015/0353823 A1 | 12/2015 | Raukas et al. |
| 2020/0199447 A1 | 6/2020 | Yoshinari et al. |

FOREIGN PATENT DOCUMENTS

| | | |
|---|---|---|
| JP | 2009084060 A | 4/2009 |
| JP | 2009143751 A | 7/2009 |
| JP | 20130533359 A | 8/2013 |
| JP | 2014525480 A | 9/2014 |
| JP | 2015510954 A | 4/2015 |
| JP | 2017197774 A | 11/2017 |
| JP | 2020100703 A | 7/2020 |
| WO | 2007/034955 A1 | 3/2007 |
| WO | 2013/172025 A1 | 11/2013 |

\* cited by examiner

RARE EARTH ALUMINATE SINTERED COMPACT AND METHOD FOR PRODUCING RARE EARTH ALUMINATE SINTERED COMPACT

CROSS-REFERENCE TO RELATED APPLICATION

This application claims priority to Japanese Patent Application No. 2020-135121, filed on Aug. 7, 2020, the disclosure of which is hereby incorporated by reference in its entirety.

BACKGROUND

The present disclosure relates to a rare earth aluminate sintered compact and a method for producing the rare earth aluminate sintered compact.

Light-emitting devices provided with a light-emitting diode (LED) or a laser diode (LD), and a wavelength conversion member that includes a phosphor that converts the wavelength of light emitted from the LED or LD are known. Such a light-emitting device is used, for example, as a light source for in-vehicle applications, general lighting, a backlight for a liquid crystal display device or a projector. For example, Japanese Patent Publication No. 2017-197774 discloses, as a wavelength conversion member provided in a light-emitting device, a single-phase ceramic conversion member obtained by sintering a phosphor raw material containing an oxide.

SUMMARY

A wavelength conversion member is expected to further enhance light emission characteristics.

Therefore, an object of the present disclosure is to provide a rare earth aluminate sintered compact with higher light emission characteristics and a method for manufacturing a rare earth aluminate sintered compact.

A first aspect is a rare earth aluminate sintered compact containing rare earth aluminate phosphor crystalline phases and voids, wherein an absolute maximum length of 90% or greater by number of the rare earth aluminate phosphor crystalline phases is in a range from 0.4 µm to 1.3 µm, wherein an absolute maximum length of 90% or greater by number of the voids is in a range from 0.1 µm to 1.2 µm, and wherein a distance between two farthest points on a contour of one of the rare earth aluminate phosphor crystalline phases or voids included in a measurement range on a surface or cross section of the rare earth aluminate sintered compact is defined as the absolute maximum length. According to an exemplary aspect, the rare earth aluminate sintered compact consists of the rare earth aluminate phosphor crystalline phases and the voids.

A second aspect is a method for producing a rare earth aluminate sintered compact, the method including: providing a raw material mixture obtained by mixing, in a liquid, oxide particles containing at least one rare earth element $Ln^1$ selected from the group consisting of Y, La, Lu, Gd, and Tb, an oxide particle containing Ce, an oxide particle containing Al, and optionally, an oxide particle containing at least one element $M^1$ selected from Ga and Sc; drying the raw material mixture to form a raw material mixture powder; forming the raw material mixture powder to obtain a formed body; and firing the formed body at a temperature in a range from 1300° C. to 1800° C. to obtain a sintered compact, wherein in the provision of the raw material mixture, a specific surface area, measured by a BET method, of at least one oxide particle selected from the oxide particle containing $Ln^1$, the oxide particle containing Ce, the oxide particle containing Al, and the oxide particle containing the element $M^1$ is 5 m²/g or greater.

According to the present disclosure, a rare earth aluminate sintered compact and a method for producing the rare earth aluminate sintered compact having higher light emission characteristics can be provided.

DETAILED DESCRIPTION

Figure 1:
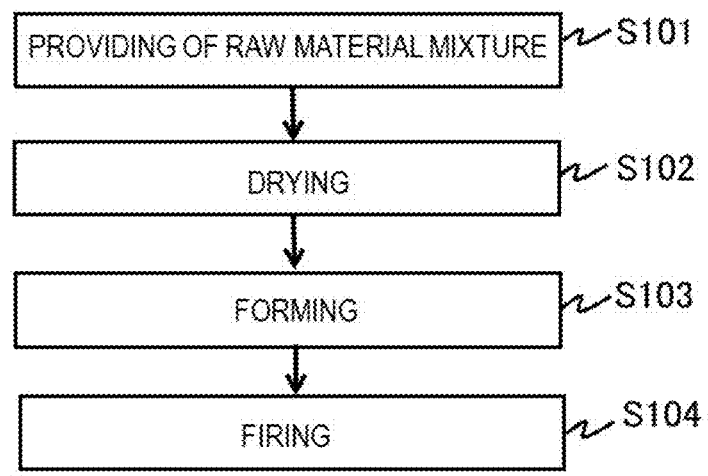
FIG. 1 is a flow chart of an exemplary method for producing a rare earth aluminate sintered compact.

A rare earth aluminate sintered compact and a method for producing the rare earth aluminate sintered compact according to the present disclosure are described below on the basis of embodiments. However, the following embodiments are examples for embodying the technical concept of the present invention, and the present invention is not limited to the following rare earth aluminate sintered compact and production method of a rare earth aluminate sintered compact. Note that the relationship between the color name and the chromaticity coordinate, the relationship between the wavelength range of light and the color name of monochromatic light are in accordance with JIS Z8110.

Rare Earth Aluminate Sintered Compact

The rare earth aluminate sintered compact contains rare earth aluminate phosphor crystalline phases and voids, and in a measurement range, an absolute maximum length of 90% or more by number of rare earth aluminate phosphor crystalline phases is in a range from 0.4 µm to 1.3 µm, and an absolute maximum length of 90% or greater by number of voids is in a range from 0.1 µm to 1.2 µm.

Condition for Measurement of Absolute Maximum Length

The absolute maximum length of the rare earth aluminate phosphor crystalline phases or voids is defined as a distance between two farthest points on a contour of one of the rare earth aluminate phosphor crystalline phases or voids included in the measurement range on a surface or cross section of the rare earth aluminate sintered compact. In addition, in an SEM image obtained by photographing a surface or cross section of a rare earth aluminate sintered compact using a scanning electron microscope (SEM), a region having a surface area of 12096 µm² is set as the measurement range, and the distance between the two farthest points on a contour of one rare earth aluminate phosphor crystal phase or void in this measurement range can be measured as the absolute maximum length. In this manner, a number distribution of absolute maximum lengths of individual rare earth aluminate phosphor crystalline phases included in the measurement range of the surface or cross section of the rare earth aluminate sintered compact is determined, and a ratio of the number of rare earth aluminate phosphor crystal phases having an absolute maximum length in a range from 0.4 µm to 1.3 µm to the total number of rare earth aluminate phosphor crystalline phases can be determined. Furthermore, a number distribution of absolute maximum lengths of individual voids contained in the measurement range of the surface or cross section of the rare earth aluminate sintered compact is determined, and a ratio of the number of voids having an absolute maximum length in a range from 0.1 µm to 1.2 µm to the total number of voids can be determined.

When the number of rare earth aluminate phosphor crystalline phases having an absolute maximum length in a range from 0.4 µm to 1.3 µm and included in the measurement range of the rare earth aluminate sintered compact is 90% or greater, a large number of small rare earth aluminate phosphor crystalline phases having an absolute maximum length in a range from 0.4 µm to 1.3 µm are included, and a large number of small crystalline phases are included in the rare earth aluminate sintered compact. When a large number of small rare earth aluminate phosphor crystalline phases are included in the rare earth aluminate sintered compact, the spread of light can be suppressed when light incident on the rare earth aluminate sintered compact is wavelength converted by the rare earth aluminate phosphor crystalline phases and exits from the rare earth aluminate sintered compact, and the light can be extracted in a forward direction.

According to an exemplary embodiment, the absolute maximum length of at least one of the rare earth aluminate phosphor crystalline phases in the rare earth aluminate sintered compact as measured under the aforementioned measurement condition is preferably in a range from 0.4 µm to 2.3 µm. According to an exemplary embodiment, the absolute maximum length of each of the rare earth aluminate phosphor crystalline phases in the rare earth aluminate sintered compact as measured under the aforementioned measurement condition is preferably in a range from 0.4 µm to 2.3 µm. Even when a rare earth aluminate phosphor crystalline phase having an absolute maximum length of 2.3 µm is included in the rare earth aluminate sintered compact, in a case where rare earth aluminate phosphor crystalline phases having an absolute maximum length in a range from 0.4 µm to 1.3 µm are included in the rare earth aluminate sintered compact at a quantity of 90% or greater, the spread of exiting light can be suppressed, and the light emission characteristics can be improved. The rare earth aluminate sintered compact may contain rare earth aluminate phosphor crystalline phases having an absolute maximum length in a range from 0.4 µm to 1.3 µm at a quantity of preferably 98.0% or less, more preferably 99.0% or less, and further more preferably 100%, and preferably 91.0% or greater, and more preferably 92.0% or greater.

The absolute maximum length at a cumulative frequency of 50% in a number particle size distribution of the absolute maximum lengths of rare earth aluminate phosphor crystalline phases is preferably in a range from 0.4 µm to 0.9 µm, or may be in a range from 0.45 µm to 0.9 µm. When the absolute maximum length at a cumulative frequency of 50% in the particle size distribution of the number absolute maximum lengths of rare earth aluminate phosphor crystalline phases is in a range from 0.4 µm to 0.9 µm, the spread of light is further suppressed when light incident on the rare earth aluminate sintered compact is wavelength converted by the rare earth aluminate phosphor crystalline phases and exits from the rare earth aluminate sintered compact. The absolute maximum length at a cumulative frequency of 50% in the number particle size distribution of the absolute maximum lengths of rare earth aluminate phosphor crystalline phases can be determined from a number particle size distribution of absolute maximum lengths of the rare earth aluminate phosphor sintered compact described above.

When the number of voids having an absolute maximum length in a range from 0.1 µm to 1.2 µm and included in the measurement range of the rare earth aluminate sintered compact is 90% or greater, the spread of light can be suppressed and light can be extracted in the forward direction when light incident on the rare earth aluminate sintered compact is scattered by the voids.

If the voids in the rare earth aluminate sintered compact measured by the aforementioned measurement method are such that the number of voids having an absolute maximum length in a range from 0.1 µm to 1.2 µm is 90% or greater, voids having an absolute maximum length in a range from 0.1 µm to 3.0 µm may be included, or voids having an absolute maximum length in a range from 0.2 µm to 2.3 µm may be included. Through the voids, light incident on the rare earth aluminate sintered compact can be appropriately scattered, and the spread of exiting light can be suppressed. The rare earth aluminate sintered compact further preferably contains voids having an absolute maximum length in a range from 0.1 µm to 1.2 µm at a quantity of preferably 98% or less, more preferably 99% or less, further more preferably 100%, and preferably 90.2% or greater, and more preferably 90.5% or greater.

The absolute maximum length at a cumulative frequency of 50% in the number particle size distribution of absolute maximum lengths of voids is preferably in a range from 0.3 µm to 0.8 µm. When the absolute maximum length at a cumulative frequency of 50% in the number particle size distribution of absolute maximum lengths of voids in the rare earth aluminate sintered compact is in a range from 0.3 µm to 0.8 µm, the light incident on the rare earth aluminate sintered compact can be appropriately scattered, and the light is less likely to spread when exiting. The absolute maximum length at a cumulative frequency of 50% in the particle size distribution of the number absolute maximum lengths of voids in the rare earth aluminate sintered compact can be determined from the aforementioned number particle size distribution of absolute maximum lengths of the voids.

The relative density of the rare earth aluminate sintered compact is preferably not less than 92%, more preferably not less than 93%, even more preferably not less than 94%, and may be not greater than 99%, or not greater than 98%. The rare earth aluminate sintered compact is formed solely from rare earth aluminate phosphor crystalline phases and voids. When the relative density of the rare earth aluminate sintered compact is in a range from 85% to 99%, excitation light that has been incident on the rare earth aluminate sintered compact is efficiently scattered by the voids, the scattered light is efficiently wavelength converted by the rare earth aluminate phosphor crystalline phases, and light that has been wavelength converted can exit from the same surface as the surface on which the excitation light was incident.

The relative density of the rare earth aluminate sintered compact can be calculated from the apparent density of the rare earth aluminate sintered compact and the true density of the rare earth aluminate sintered compact according to Formula (1) below.

[Formula 1]

Relative Density (%) of Rare Earth Aluminate Sintered Compact (Apparent Density of Rare Earth Aluminated Sintered Compact)÷(True Density of Rare Earth Aluminate Sintered Compact)× 100     (1)

The apparent density of the rare earth aluminate sintered compact is a value obtained by dividing the mass of the rare earth aluminate sintered compact by the volume of the rare earth aluminate sintered compact, and can be calculated by Formula (2) below. As the true density of the rare earth aluminate sintered compact, the true density of the rare earth aluminate phosphors can be used.

[Formula 2]

Apparent Density of rare Earth Aluminate Sintered Compact=(Mass(g) of Rare Earth Aluminated Sintered Compact)÷(Volume (Archimedes method)(cm³) of Rare earth Aluminate Sintered Compact)     (2)

The porosity of the rare earth aluminate sintered compact is a remainder obtained by subtracting the relative density of the rare earth aluminate sintered compact from 100%, and is preferably in a range from 1% to 8%. The porosity of the rare earth aluminate sintered compact can be calculated by Formula (3) below, as necessary.

[Formula 3]

Porosity (%) of Rare Earth Aluminate Sintered Compact=100(%)−Relative Density (%) of rare Earth Aluminate Sintered Compact     (3)

The rare earth aluminate phosphor crystalline phases preferably have a composition represented by Formula (I) below.

$$(Ln^1_{1-n}Ce_n)_3(Al_{1-m}M^1_m)_{5k}O_{12} \quad (I)$$

In Formula (I) above, $Ln^1$ is at least one element selected from the group consisting of Y, La, Lu, Gd, and Tb; $M^1$ is at least one element selected from Ga and Sc; and m, n, and k satisfy 0≤m≤0.02, 0.002≤n≤K 0.017, and 0.95≤k≤1.05, respectively. Of course, the variables m, n, and k in Formula (I) are numbers obtained when the total of the molar ratio of $Ln^1$ and the molar ratio of Ce based on the analysis values is set to 3. In the present specification, molar ratio means the molar ratio of each element in one mole of the chemical composition of the rare earth aluminate phosphor.

In the composition represented by Formula (I) above, $Ln^1$ is at least one rare earth element selected from the group consisting of Y, Gd, Lu, and Tb, and may include two or more rare earth elements. Ce is an activation element of the rare earth aluminate phosphor crystalline phases, and the product of the variable n and 3 represents the molar ratio of Ce in the composition represented by Formula (I). The variable n is more preferably in a range from 0.002 to 0.016 (0.002≤n≤0.016), and even more preferably in a range from 0.003 to 0.015 (0.003≤n≤0.015). In the composition represented by Formula (I), the product of the variable m, 5, and the variable k represents the molar ratio of the element $M^1$.

The element $M^1$ may not be included in the composition represented by Formula (I), that is, m may be 0. In the composition represented by Formula (I) above, in order to convert wavelengths to desired chromaticities, the variable m may be in a range from 0.00001 to 0.02 (0.00001≤m≤0.02), or may be in a range from 0.00005 to 0.018 (0.00005≤m≤0.018). In the composition represented by Formula (I), the product of the variable k and 5 represents the total molar ratio of Al and the element $M^1$. The variable k is more preferably in a range from 0.96 to 1.03 (0.96≤k≤1.03), and even more preferably in a range from 0.97 to 1.02 (0.97≤k≤1.02).

In an exemplary rare earth aluminate sintered compact, the rare earth aluminate phosphor crystalline phase preferably contains Lu, the absolute maximum length of at least one of the rare earth aluminate phosphor crystalline phase is preferably in a range from 0.4 μm to 2.3 μm, and an absolute maximum length of at least one of the voids is preferably in a range from 0.1 μm to 2.3 μm. In an exemplary rare earth aluminate sintered compact, the rare earth aluminate phosphor crystalline phase preferably contains Lu, the absolute maximum length of each of the rare earth aluminate phosphor crystalline phase is preferably in a range from 0.4 μm to 2.3 μm, and an absolute maximum length of each of the voids is preferably in a range from 0.1 μm to 2.3 μm. When the absolute maximum lengths are within such ranges, the spread of light can be suppressed when light incident on the rare earth aluminate sintered compact is wavelength-converted by the rare earth aluminate phosphor crystalline phases and exits from the rare earth aluminate sintered compact.

When the rare earth aluminate phosphor crystalline phases contain Lu in the composition thereof, the rare earth aluminate phosphor crystalline phases preferably have a composition represented by the following Formula (Ia).

$$(Lu_{1-q-n}Ln^2_qCe_n)_3(Al_{1-m}M^1_m)_{5k}O_{12} \quad (Ia)$$

In Formula (Ia) above, $Ln^2$ is at least one element selected from the group consisting of La, Gd, and Tb; $M^1$ is at least one element selected from Ga and Sc; and q, m, n, and k satisfy 0≤q≤0.9, 0≤m≤0.02, 0.002≤n≤0.017, and 0.95≤k≤1.05, respectively. Of course, the variables m, n, and k in Formula (Ia) are numbers obtained when the total of the molar ratio of Lu, the molar ratio of $Ln^2$, and the molar ratio of Ce based on analysis values is set to 3.

The rare earth aluminate sintered compact can be used as a reflection type wavelength conversion member in which an incident surface (first main surface) on which excitation light is incident and an exiting surface (first main surface) from which the wavelength-converted light exits are the same surface. When the rare earth aluminate sintered compact is used as a reflection type wavelength conversion member in which the incident surface of the excitation light and the exiting surface of light are the same surface, the thickness of the rare earth aluminate sintered compact is not limited, and when the rare earth aluminate sintered compact is a plate-like body, the plate thickness is preferably in a range from 90 μm to 250 μm, and more preferably in a range from 100 μm to 240 μm.

In an exemplary rare earth aluminate sintered compact, the rare earth aluminate phosphor crystalline phases preferably contain Y, the absolute maximum length of at least one of the rare earth aluminate phosphor crystalline phases is preferably in a range from 0.4 μm to 2.1 μm, and an absolute maximum length of at least one of the voids is preferably in a range from 0.1 μm to 3.0 μm. In an exemplary rare earth aluminate sintered compact, the rare earth aluminate phosphor crystalline phases preferably contain Y, the absolute maximum length of each of the rare earth aluminate phosphor crystalline phases is preferably in a range from 0.4 μm to 2.1 μm, and an absolute maximum length of each of the voids is preferably in a range from 0.1 μm to 3.0 μm. When the absolute maximum lengths thereof are within such ranges, a light emission color of a desired chromaticity can be obtained, and when the incident light exits form the rare earth aluminate sintered compact after wavelength conversion by the rare earth aluminate phosphor crystalline phases, spreading of the light can be suppressed.

When the rare earth aluminate phosphor crystalline phases contain Y in the composition thereof, the rare earth aluminate phosphor crystalline phases preferably have a composition represented by the following Formula (Ib).

$$(Y_{1-p-n}Ln^3_p Ce_n)_3(Al_{1-m}M^1_m)_{5k}O_{12} \quad (Ib)$$

In Formula (Ib) above, $Ln^3$ is at least one type of rare earth element selected from the group consisting of La, Gd, and Tb; $M^1$ is at least one type of element selected from Ga and Sc; and p, m, n, and k are numbers that satisfy $0 \leq p \leq 0.9$, $0 \leq m \leq 0.02$, $0.002 \leq n \leq 0.017$, and $0.95 \leq k \leq 1.05$, respectively. Of course, the variables m, n, and k in formula (Ib) above are numbers obtained when the total of the molar ratio of Y, the molar ratio of $Ln^3$, and the molar ratio of Ce based on analysis values is set to 3.

For a case in which a rare earth aluminate sintered compact formed in a plate shape is such that the incident surface on which excitation light is incident and the exiting surface from which the light exits are the same surface, when the light diameter of the incident light is considered to be 100%, the light diameter of the exiting light is preferably less than 100%, more preferably 95% or less, and even more preferably 94% or less. In this manner, if the light diameter of the exiting light exiting from the same surface as the incident surface is less than 100% with respect to the light diameter of the incident light which is considered to be 100%, spreading of the exiting light is suppressed, and the light exiting from the rare earth aluminate sintered compact can be condensed onto a targeted position. The light diameter of the incident light incident on one surface of the rare earth aluminate sintered compact is the light diameter of light emitted from the light source. The light diameter of the incident light can be measured by, for example, a color luminance meter. The light diameter of the incident light is preferably in a range from 0.1 mm to 5 mm, and more preferably in a range from 0.5 mm to 4 mm. The light diameter of the exiting light exiting from the same surface of the rare earth aluminate sintered compact as the surface on which incident light was incident can be obtained through a color luminance meter to measure the light emission luminance of light exiting from the rare earth aluminate sintered compact, using, as a center (measurement center), a position at which the maximum luminance in the obtained light emission spectrum is exhibited, measuring absolute values of distances (mm) from the measurement center, of two positions at which the luminance is 30/100 (hereinafter, may be referred to as "30/100 luminance") of the maximum luminance in the light emission spectrum, and measuring, as the light diameter of the exiting light, the sum of the absolute values of the distances (mm) from the measurement centers, of the two positions at which the luminance is 30/100 of the maximum luminance in the light emission spectrum.

Method for Producing Rare Earth Aluminate Sintered Compact

The method for producing a rare earth aluminate sintered compact includes: providing a raw material mixture, for example, a slurry containing the raw materials, obtained by mixing, in a liquid, oxide particles containing at least one type of rare earth element $Ln^1$ selected from the group consisting of Y, La, Lu, Gd, and Tb, oxide particles containing Ce, oxide particles containing Al, and as necessary, at least one type of element $M^1$ selected from Ga and Sc;

drying the raw material mixture to form a raw material mixture powder;

forming the raw material mixture powder to obtain a formed body; and firing the formed body at a temperature in a range from 1300° C. to 1800° C. to obtain a sintered compact; and in the provision of the raw material mixture, a specific surface area, measured by the BET method, of at least one type of oxide particle selected from the oxide particles containing $Ln^1$, the oxide particles containing Ce, the oxide particles containing Al, and the oxide particles containing the element $M^1$ is 5 $m^2/g$ or greater.

Figure 2:
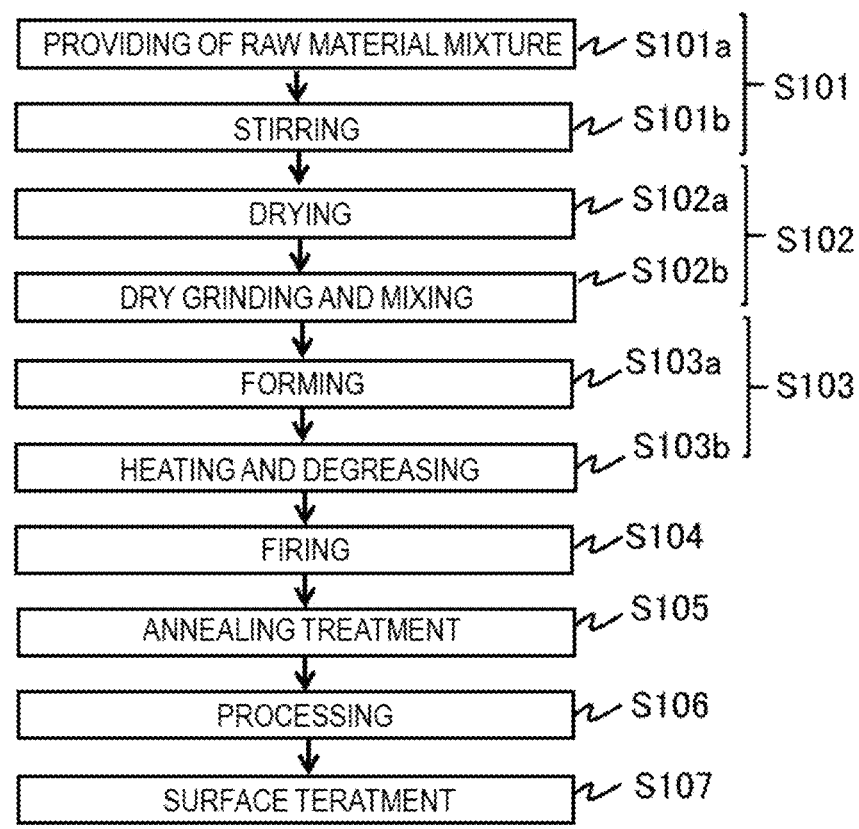
FIG. 2 is a flow chart of an exemplary method for producing a rare earth aluminate sintered compact.

FIG. 1 is a flowchart illustrating an example of a method for producing a rare earth aluminate sintered compact. The method for producing a rare earth aluminate sintered compact is described with reference to FIG. 1. The method for producing a rare earth aluminate sintered compact includes a provision step S101 of providing a raw material mixture, for example, a slurry, in which raw material particles are mixed with a liquid, a drying step S102 of drying the raw material mixture in a slurry form to obtain a raw material mixture powder, a forming step S103 of forming the raw material mixture powder, and a firing step S104 of firing a formed body to obtain a sintered compact. FIG. 2 is a flowchart illustrating another example of a method for producing a rare earth aluminate phosphor sintered compact. The provision step S101 of providing the raw material mixture may include a provision step S101a of providing the raw material mixture, and a step S101b of stirring the raw material mixture. The drying step S102 may include a drying step S102a of drying the raw material mixture to obtain a raw material mixture powder, and a dry grinding and mixing step S102b of dry grinding and mixing the obtained raw material mixture powder. The forming step S103 may include a forming step S103a of forming the raw material mixture powder, and a heating and degreasing step S103b in which the formed body that was formed is heated and degreased at a temperature lower than the firing temperature. In addition, the method for producing a rare earth aluminate sintered compact may include an annealing step S105 after the firing step S104. Furthermore, the method for producing a rare earth aluminate sintered compact may include a processing step S106 in which the obtained sintered compact is cut to a desired size or thickness, and may further include a surface treatment step S107 of surface treating the sintered compact.

Provision of the Raw Material Mixture

The raw materials include oxide particles containing at least one type of rare earth element $Ln^1$ selected from the group consisting of Y, La, Lu, Gd and Tb, oxide particles containing Ce, oxide particles containing Al, and as necessary, oxide particles containing at least one type of element $M^1$ selected from Ga and Sc. Specific examples of the oxide particles containing the rare earth element $Ln^1$ include yttrium oxide particles, lanthanum oxide particles, lutetium oxide particles, gadolinium oxide particles, and terbium oxide particles. Other oxide particles include cerium oxide particles, aluminum oxide particles, gallium oxide particles, and scandium oxide particles.

The oxide particles containing the rare earth element $Ln^1$, the oxide particles containing Ce, the oxide particles containing Al, and as necessary, the oxide particles containing the element $M^1$ all preferably have a specific surface area of 5 m$^2$/g or greater as measured by the BET method. Oxide particles having a large specific surface area are oxide particles having a small particle size, and through firing, such oxide particles can form a rare earth aluminate phosphor crystalline phase with an absolute maximum length in a specific range as described above. The specific surface area of the oxide particles containing a rare earth element $Ln^1$, the oxide particles containing Ce, the oxide particles containing Al, and the oxide particles containing the element $M^1$ may be 150 m$^2$/g or less as measured by the BET method. The upper limit of the specific surface area measured by the BET method differs depending on the type of oxide particles. The specific surface area of the oxide particles containing Ce as measured by the BET method may be 130 m$^2$/g or less, or may be 125 m$^2$/g or less. The specific surface area of the oxide particles containing the rare earth element $Ln^1$, the oxide particles containing Al, and the oxide particles containing the element $M^1$ may be 100 m$^2$/g or less, or may be 50 m$^2$/g or less as measured by the BET method. If the specific surface area of the oxide particles is too large, the oxide particles may not be uniformly dispersed in the raw material mixture, and homogeneous rare earth aluminate phosphor crystalline phases may not be formed in the rare earth aluminate sintered compact.

Each oxide contained in the raw material mixture is preferably blended so as to have a molar ratio resulting in the composition represented by Formula (I), the composition represented by Formula (Ia), or the composition represented by Formula (Ib).

The raw materials may further include rare earth aluminate phosphor particles. When the raw material contains rare earth aluminate phosphor particles, the specific surface area of the rare earth aluminate phosphor particles used as a raw material is preferably not less than 5 m$^2$/g as measured by the BET method. Through firing, the rare earth aluminate phosphor particles having a large specific surface area can form, along with the other raw oxide particles, small rare earth aluminate phosphor crystalline phases of which the absolute maximum length described above is within a specific range. The specific surface area of the rare earth aluminate phosphor particles used as a raw material is preferably not less than 6 m$^2$/g, and may be not greater than 15 m$^2$/g, or not greater than 12 m$^2$/g. If the specific surface area of the rare earth aluminate phosphor particles used as a raw material is too large, it is difficult to uniformly disperse the particles in the raw material mixture, and it may be difficult to form homogeneous rare earth aluminate phosphor crystal phases in the rare earth aluminate sintered compact.

When each oxide contained in the raw material mixture is formulated so as to have a molar ratio resulting in the composition represented by, for example, Formula (I), the rare-earth aluminate phosphor particles used as raw materials preferably have the composition represented by Formula (I).

When the raw material mixture contains rare earth aluminate phosphor particles, the mass ratio of the rare earth aluminate phosphor particles relative to a total of 100 mass % of the rare earth aluminate phosphor particles, the oxide particles containing a rare earth element $Ln^1$, the oxide particles containing Ce, the oxide particles containing Al, and as necessary, the oxide particles containing an element $M^1$, is preferably in a range from 10 mass % to 90 mass %, more preferably in a range from 15 mass % to 80 mass %, and even more preferably in a range from 30 mass % to 70 mass %. Small rare earth aluminate phosphor crystalline phases of which the above-described absolute maximum length is within a specific range can be formed if, relative to a total of 100 mass % of the rare earth aluminate phosphor particles and all of the oxide particles used as raw materials, the mass ratio of the rare earth aluminate phosphor particles used as raw materials is in a range from 10 mass % to 90 mass %, and the rare earth aluminate phosphor particles and at least one type of particle selected from the various oxide particles, or the rare earth aluminate phosphor particles and all of the oxide particles have a specific surface area of 5 m$^2$/g or greater according to the BET method.

The rare earth aluminate phosphor particles used as raw materials are preferably rare earth aluminate phosphor particles formed by a co-precipitation method. Rare earth aluminate phosphor particles having a large specific surface area can be produced by a co-precipitation method.

As a method of forming rare earth aluminate phosphor particles through co-precipitation, for example, oxides containing a constituent element included in the composition of a rare earth aluminate or a compound that readily forms an oxide at high temperature are provided as raw materials, and each compound is weighed so as to form the composition of the rare earth aluminate with consideration given to the stoichiometric ratio. Each compound that has been weighed to form the composition of the rare earth aluminate is dissolved in a solvent, and a precipitation agent is fed into the solution and co-precipitated to obtain a co-precipitate. The oxide obtained by firing the co-precipitate and, as necessary, other raw materials such as oxides contained in the composition of the rare earth aluminate are weighed, and the raw materials are wet or dry mixed. Flux may be added to the raw materials. Rare earth aluminate phosphor particles formed through co-precipitation can be obtained by firing a mixture containing the oxide obtained by co-precipitation, the other raw materials, and, as necessary, a flux. Examples of compounds that readily form oxides at high temperatures include hydroxides, oxalates, carbonates, chlorides, nitrates, and sulfates containing elements constituting the composition of the rare earth aluminate. The compound that readily forms an oxide at high temperature may be a metal made from an element that constitutes the composition of a rare earth aluminate, such as for example, aluminum alone. An oxide similar to the oxide used in the aforementioned raw material mixture can be used as the oxide. Examples of the solvent for dissolving the metal or each compound include deionized water and the like. Examples of the precipitation agent include oxalic acid or oxalate, carbonate, and ammonium hydrogen carbonate. An example of the oxalate is ammonium oxalate, and an example of the carbonate is ammonium carbonate.

Oxide particles containing a rare earth element $Ln^1$, oxide particles containing Ce, oxide particles containing Al, and as necessary, oxide particles containing an element $M^1$, and as necessary, rare earth aluminate phosphor particles, are mixed into a liquid to obtain a raw material mixture, for example, a slurry containing the raw materials. A rare earth aluminate sintered compact having homogeneous rare earth aluminate phosphor crystalline phases can be produced by uniformly dispersing each of the oxide particles and, as necessary, the rare earth aluminate phosphor particles in a liquid through mixing. Examples of the liquid in which the raw materials are dispersed include deionized water, water, and ethanol. The amount of liquid is preferably in a range from 10 parts by mass to 200 parts by mass, and may be in a range from 50 parts by mass to 150 parts by mass relative to the total amount of 100 parts by mass of the oxide particles containing a rare earth element $Ln^1$, the oxide particles containing Ce, the oxide particles containing Al, and as necessary, the oxide particles containing an element $M^1$, and as necessary, the rare earth aluminate phosphor particles.

The raw material mixture may contain a dispersant to increase dispersibility. As the dispersant, for example, an organic dispersant can be used, and cationic dispersants, anionic dispersants, and nonionic dispersants can be used. When a dispersant is added to the raw material mixture, the amount of the dispersant is preferably an amount that can be volatilized by subsequent heating and degreasing or firing, and may be 10 mass % or less, 5 mass % or less, or 3 mass % or less relative to the total amount of 100 mass % of the oxide particles containing a rare earth element $Ln^1$, the oxide particles containing Ce, the oxide particles containing Al, and as necessary, the oxide particles containing an element $M^1$, and as necessary, the rare earth aluminate phosphor particles.

Stirring

Provision of the raw material mixture may include stirring the obtained raw material mixture. The raw material mixture is preferably stirred at a stirring speed in a range from 20 rpm to 250 rpm for a period of time in a range from 2 hours to 40 hours. The oxide particles and, as necessary, the rare earth aluminate phosphor particles are uniformly dispersed by uniformly mixing the raw material mixture, and small rare earth aluminate phosphor crystalline phases of which the absolute maximum lengths are within a specific range are formed in the rare earth aluminate sintered compact.

Drying

The method for producing a rare earth aluminate sintered compact may include drying the obtained the raw material mixture to obtain a raw material mixture powder. The drying temperature is preferably in a range from 50° C. to 150° C., and the drying time is preferably in a range from 1 hour to 20 hours. By drying the raw material mixture in which raw materials are uniformly mixed, a raw material mixture powder in which the raw materials are uniformly mixed can be obtained.

Dry Grinding and Mixing

The method for producing a rare earth aluminate sintered compact may include dry grinding and mixing to grind and mix the raw material mixture powder. The dry grinding and mixing are preferably implemented for 1 hour using a ball mill, for example. All of the particles in the raw material mixture powder need not be ground, and only a portion thereof needs to be ground and mixed. Agglomeration of the particles in the raw material mixture is suppressed by implementing dry grinding and mixing.

Forming

The method for producing the rare earth aluminate sintered compact includes forming the obtained raw material mixture powder to obtain a formed body. As the method of forming the raw material mixture powder, a known method such as a press forming method can be used. Examples of the press forming method include a method of press forming with a mold, and a cold isostatic pressing (CIP) method for which the term is defined in JIS Z2500:2000, No. 2109. The raw material mixture powder may be uni-axially compressed and formed. Two types of forming methods may be used to shape the formed body. For example, CIP may be implemented after press forming with a mold, or the raw material mixture powder may be uni-axially compressed through a roller bench method, followed by the implementation of CIP. With CIP, a formed body is preferably pressed by cold isostatic pressing using water as a medium.

The pressure for press forming with a mold or the pressure for uni-axially compressing and forming is preferably in a range from 5 MPa to 50 MPa, and more preferably in a range from 5 MPa to 30 MPa. If the pressure for press forming with a mold or the pressure for uni-axially compressing and forming is in the range described above, the formed body can be formed into a desired shape.

The pressure for CIP is preferably in a range from 50 MPa to 200 MPa, and more preferably in a range from 50 MPa to 180 MPa. When the pressure for CIP is in the range from 50 MPa to 200 MPa, a formed body can be formed with which a rare earth aluminate sintered compact having a relative density of 90% or greater and a porosity in a range from 1% to 10% can be obtained through firing.

Heating and Degreasing

The method for producing a rare earth aluminate sintered compact may include removing the dispersant and the like to degrease by heating the formed body that has been formed. When heating for degreasing is implemented, heating is preferably performed in a range from 500° C. to 1000° C. in an atmosphere of air and nitrogen. By heating in an atmosphere of air and nitrogen at a temperature in a range from 500° C. to 1000° C., the amount of carbon contained in the formed body decreases, and thereby a decrease in luminous flux due to the carbon included can be suppressed.

Firing

The method for producing a rare earth aluminate sintered compact includes firing the obtained formed body at a temperature in a range from 1300° C. to 1800° C. to obtain a sintered compact.

Firing of the formed article is performed at a temperature in a range of from 1300° C. to 1800° C., preferably in a range from 1400° C. to 1790° C., and more preferably in a range from 1450° C. to 1780° C. When the firing temperature is at least 1300° C., the uniformly mixed raw materials having a large specific surface area react, and a sintered compact containing voids and rare earth aluminate phosphor crystalline phases having an absolute maximum length in a specific range can be obtained.

Firing of the formed article is preferably performed in an oxygen-containing atmosphere. The content of oxygen in the atmosphere is preferably not less than 5 vol %, more preferably not less than 10 vol %, and even more preferably not less than 15 vol %. The formed article may be fired in an air atmosphere (oxygen content of 20 vol % or greater). In an atmosphere in which the content of oxygen in the atmosphere is less than 1 vol. %, oxide surfaces are not easily melted, the oxides themselves melt, crystalline structures having the composition of the rare earth aluminate are not easily produced, and a sintered compact having voids may be difficult to be obtained. The amount of oxygen in the atmosphere may be measured, for example, by the amount of oxygen flowing into the firing device, and may be measured at a temperature of 20° C. and atmospheric pressure (101.325 kPa).

Annealing Treatment

The method for producing a rare earth aluminate sintered compact may include annealing the obtained sintered compact in a reducing atmosphere. When the obtained sintered compact is annealed in a reducing atmosphere, cerium, which is the oxidized activation element contained in the crystalline phases in the sintered compact, is reduced, and a reduction in wavelength conversion efficiency and a decrease in luminous efficiency in each crystalline phase can be suppressed. The reducing atmosphere may be an atmosphere containing: at least nitrogen gas or one type of noble gas selected from the group consisting of helium, neon, and argon; and hydrogen gas or carbon monoxide gas. The reducing atmosphere more preferably contains: at least argon or nitrogen gas; and hydrogen gas or carbon monoxide gas. The annealing treatment may be performed after processing.

The temperature of the annealing treatment is lower than the firing temperature and is preferably in a range from 1000° C. to 1600° C. The temperature of the annealing treatment is more preferably in a range from 1100° C. to 1400° C. If the temperature of the annealing treatment is lower than the firing temperature and is in a range from 1000° C. to 1600° C., cerium, which is the oxidized activation element contained in the crystalline phases in the sintered compact, can be reduced without decreasing the voids in the sintered compact, and a reduction in the wavelength conversion efficiency and a decrease in luminous efficiency can be suppressed.

Processing

The method for producing a rare earth aluminate sintered compact may include processing to cut the obtained sintered compact to a desired size or thickness. A known method can be used as the cutting method, and examples include blade dicing, laser dicing, and cutting using a wire saw.

Surface Treatment

The method for producing a rare earth aluminate sintered compact may also include a surface treatment as described below. The surface treatment is performed on the obtained rare earth aluminate sintered compact or on a surface of a cut component obtained by cutting the rare earth aluminate sintered compact. Through this surface treatment, not only can the surface of the rare earth aluminate sintered compact be configured in an appropriate state in order to improve the light emission characteristics of the rare earth aluminate sintered compact, but also the rare earth aluminate sintered compact can be formed in a desired shape, size, or thickness, in conjunction with the above-described processing, or through the surface treatment alone. The surface treatment may be performed before the rare earth aluminate sintered compact is cut to a desired size or thickness and processed, or may be performed after processing. Examples of the surface treatment method include a sand blasting method, a mechanical grinding method, a dicing method, and a chemical etching method.

Through the abovementioned production method, a rare earth aluminate sintered compact that contains rare earth aluminate phosphor crystalline phases and voids is obtained with which the absolute maximum length of 90% or more by number of rare earth aluminate phosphor crystalline phases is in a range from 0.4 μm to 1.3 μm, and the absolute maximum length of 90% or more by number of voids is in a range from 0.1 μm to 1.2 μm. The rare earth aluminate phosphor crystalline phases contained in the rare earth aluminate sintered compact obtained by the production method described above preferably have a composition represented by Formula (I) above, a composition represented by Formula (Ia) above, or a composition represented by Formula (Ib) above.

The obtained rare earth aluminate sintered compact can be used as a wavelength conversion member in a light-emitting device such as a light source for a projector by combining with a light source.

Light-Emitting Device

A light-emitting device in which the rare earth aluminate sintered compact described above is used as a wavelength conversion member is described. The light-emitting device is provided with a rare earth aluminate sintered compact and an excitation light source.

The excitation light source is preferably a semiconductor light-emitting element formed from an LED chip or an LD chip. A nitride semiconductor can be used as the semiconductor light-emitting element. By using a semiconductor light-emitting element as an excitation light source, a stable light-emitting device that exhibits high efficiency and high output linearity with respect to an input and that is strong against mechanical impact can be obtained. The rare earth aluminate sintered compact can be used in a light-emitting device that converts the wavelength of light emitted from the semiconductor light-emitting element and emits a mixed color light that has been wavelength converted. The semiconductor light-emitting element preferably emits light in a wavelength range from 350 nm to 500 nm, for example. The rare earth aluminate sintered compact preferably converts the wavelength of excitation light from the semiconductor light-emitting element, and emits light having an emission peak wavelength in a range from 500 nm to 650 nm.

The excitation light source is more preferably a semiconductor laser. Excitation light emitted from a semiconductor laser, which is an excitation light source, may be incident on the rare earth aluminate sintered compact using the rare earth aluminate sintered compact as a wavelength conversion member, and light with which the wavelength has been converted by the rare earth aluminate sintered compact may be condensed, separated into red light, green light, and blue light by a plurality of optical systems such as a lens array, a polarization conversion element, and a color separation optical system, and modulated according to image information to form image light of the colors. Excitation light emitted from a semiconductor laser used as an excitation light source may be incident on the rare earth aluminate sintered compact through an optical system such as a dichroic mirror or a collimating optical system.

Figure 3:
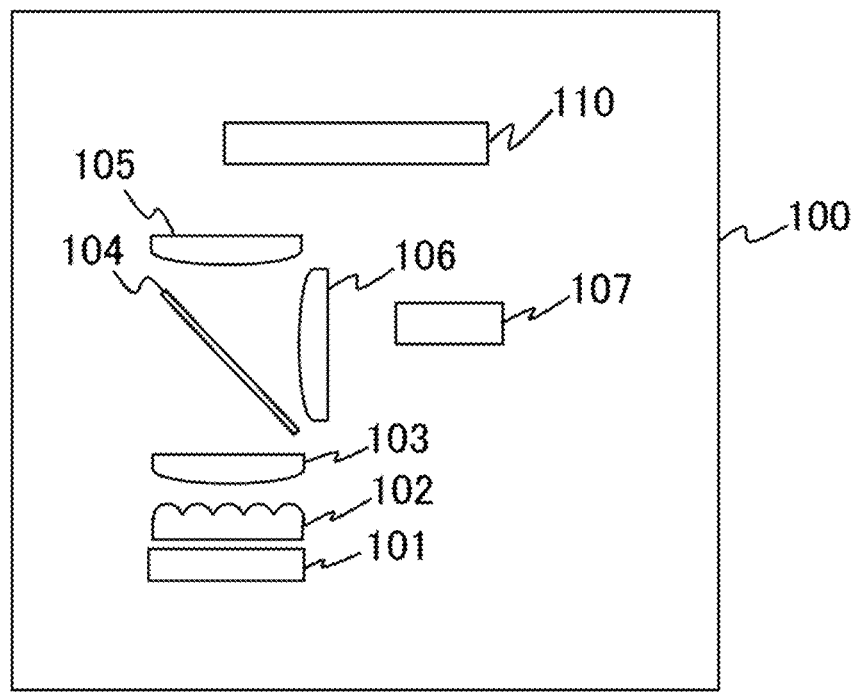
FIG. 3 is a diagram illustrating a schematic configuration of an example of a light-emitting device.

FIG. 3 is a diagram illustrating a schematic configuration of one example of a light-emitting device 100. The light-emitting device 100 preferably includes an excitation light source 101, a collimating lens 102, three condenser lenses 103, 105 and 106, a dichroic mirror 104, a rod integrator 107, and a phosphor device 110 including a rare earth aluminate sintered compact. A semiconductor laser is preferably used as the excitation light source 101. In addition, as the excitation light source 101, a plurality of semiconductor lasers may be used, or a plurality of semiconductor lasers may be arranged in an array or matrix shape and used. The collimating lens 102 may be a collimating lens array in which a plurality of collimating lenses are arranged in an array. A laser beam emitted from the excitation light source 101 is substantially collimated by the collimating lens 102, condensed by the condenser lens 103, passed through the dichroic mirror 104, and condensed by the condenser lens 105. The laser beam condensed by the condenser lens 105 is wavelength converted by the phosphor device 110, which includes the rare earth aluminate sintered compact, and light having an emission peak wavelength in a desired wavelength range exits from the phosphor device 110. The wavelength converted light exiting from the phosphor device 110 is condensed by the condenser lens 106 and is incident on the rod integrator 107, and light with increased uniformity of the illuminance distribution in an area to be illuminated exits from the light-emitting device 100. The light-emitting device 100 including the rare earth aluminate sintered compact can be used as a light source for a projector.

Figure 4:
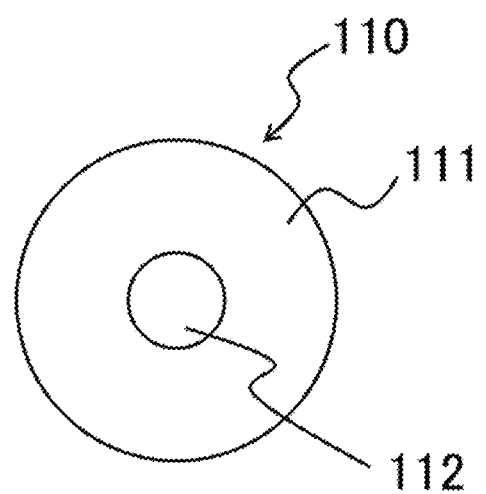
FIG. 4 is a plan view illustrating a schematic configuration of an example of a phosphor device including a rare earth aluminate sintered compact.

FIG. 4 is a plan view illustrating a schematic configuration of an example of a phosphor device. The phosphor device 110 is provided with at least a rare earth aluminate sintered compact 111. The phosphor device 110 is provided with a disc-shaped rare earth aluminate sintered compact 111, and may be provided with a rotation mechanism 112 for rotating the rare earth aluminate sintered compact 111. The rotation mechanism 112 is coupled to a drive mechanism such as a motor, and can dissipate heat by rotating the rare earth aluminate sintered compact 111.

Figure 5:
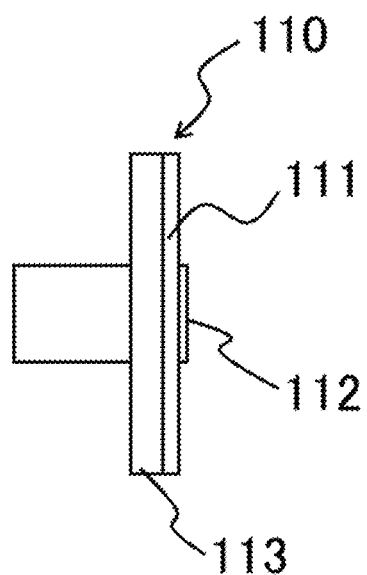
FIG. 5 is a side view illustrating a schematic configuration of an example of a phosphor device.

FIG. 5 is a side view illustrating a schematic configuration of an example of a phosphor device. The phosphor device 110 may be provided with a heat sink 113 that is in contact with the rare earth aluminate sintered compact 111. The phosphor device 110 can dissipate heat by rotating the rare earth aluminate sintered compact 111 using the rotation mechanism 112 and transferring the heat generated by the rare earth aluminate sintered compact 111 to the heat sink 113, and therefore, can easily dissipate heat from the heat sink 113 to outside of the phosphor device 110.

EXAMPLES

The present disclosure will be described in detail hereinafter using examples. However, the present invention is not limited to these examples.

Production Example of Rare Earth Aluminate Phosphor Particles (LAG Phosphor Particles by Co-Precipitation Method)

Lutetium chloride ($LuCl_3$), cerium chloride ($CeCl_3$), and aluminum chloride ($AlCl_3$) were weighed to form a composition represented by $Lu_{2.987}Ce_{0.013}Al_5O_{12}$, and then dissolved in deionized water to produce a mixed solution. The mixed solution was added to a $(NH_3)_2CO_3$ solution, and a mixture represented by $Lu_{2.987}Ce_{0.013}Al_5O_{12}$ was obtained through co-precipitation. The obtained mixture was inserted into an aluminum crucible and fired for 10 hours at a temperature in a range from 1200° C. to 1600° C. in an air atmosphere, and a fired component was obtained. The obtained fired component was classified by passing it through a dry sieve, and LAG phosphor particles (co-precipitated LAG phosphor particles) having a composition represented by $Lu_{2.987}Ce_{0.013}Al_5O_{12}$ were provided. The specific surface area of the LAG phosphor particles (co-precipitated LAG phosphor particles) measured by the BET method was 8.8 $m^2/g$.

Production Example of Rare Earth Aluminate Phosphor Particles (YAG Phosphor Particles by Co-Precipitation Method)

Yttrium chloride ($YCl_3$), cerium chloride ($CeCl_3$), and aluminum chloride ($AlCl_3$) were weighed to form a composition represented by $Y_{2.99}Ce_{0.01}Al_5O_{12}$, and the composition thereof was dissolved in deionized water to produce a mixed solution. The mixed solution was added to a $(NH_3)_2CO_3$ solution, and a mixture represented by $Y_{2.99}Ce_{0.01}Al_5O_{12}$ was obtained through co-precipitation. The obtained mixture was inserted into an aluminum crucible and fired for 10 hours at a temperature in a range from 1200° C. to 1600° C. in an air atmosphere, and a fired component was obtained. The obtained fired component was classified by passing it through a dry sieve, and YAG phosphor particles (co-precipitated YAG phosphor particles) having a composition represented by $Y_{2.99}Ce_{0.01}Al_5O_{12}$ were provided. The specific surface area of the YAG phosphor particles (co-precipitated YAG phosphor particles) measured by the BET method was 8.0 $m^2/g$.

Lutetium Oxide

Lutetium oxide particles having a purity of lutetium oxide of 99 mass % were used.

Yttrium Oxide

Yttrium oxide particles having a purity of yttrium oxide of 98 mass % were used.

Aluminum Oxide

Aluminum oxide particles having a purity of aluminum oxide of 99 mass % were used.

Cerium Oxide

Cerium oxide particles having a purity of cerium oxide of 92 mass % were used.

Specific Surface Area

The specific surface areas of the yttrium oxide particles, the aluminum oxide particles, the cerium oxide particles, the LAG phosphor particles, and the YAG phosphor particles were measured by the BET method using a specific surface area measuring device (available from Mountech Co., Ltd.).

Example 1

Provision of the Raw Material Mixture

Lutetium oxide particles having a specific surface area measured by the BET method of 12 $m^2/g$, aluminum oxide particles having a specific surface area measured by the BET method of 11.8 $m^2/g$, and cerium oxide particles having a specific surface area measured by the BET method of 125 $m^2/g$ were weighed to form a composition in which the molar ratio of each element of Lu, Al, and Ce included in the oxide particles was expressed by $Lu_{2.987}Ce_{0.013}Al_5O_{12}$. The specific surface area according to the BET method of each of the oxide particles that were used is shown in Table 1. Four parts by mass of a dispersant (FlOWLEN G-700, available from Kyoeisha Chemical Co., Ltd.) were added to 100 parts by mass of the total amount of the lutetium oxide particles, the aluminum oxide particles, and the cerium oxide particles, and 50 parts by mass of ethanol were further added to provide a raw material mixture.

Stirring

The raw material mixture was stirred for 15 hours in a wet ball mill, and a slurry containing raw material mixture in which the lutetium oxide particles, the aluminum oxide particles, and the cerium oxide particles were uniformly mixed was provided.

Drying

The obtained the slurry containing raw material mixture was dried for 10 hours at 130° C. in an air atmosphere to obtain a raw material mixture powder.

Forming

The obtained raw material mixture powder was supplied in a mold, and the raw material mixture powder was press formed at a pressure of 5 MPa (51 kef/$cm^2$), and thereby a cylindrical formed body with a diameter of 26 mm and a thickness of 10 mm was formed. The obtained formed body was inserted into a packaging container and vacuum-packaged, CIP was performed at 176 MPa using a cold isostatic pressing device (available from Kobe Steel, Ltd. (KELCO)) and a formed body was obtained.

Heating and Degreasing

The obtained formed body was heated and degreased at 700° C. in a nitrogen atmosphere.

Firing

The obtained formed body was fired in a firing furnace (available from Marusho Denki Co., Ltd.) to obtain a rare earth aluminate sintered compact. The firing was implemented in an air atmosphere (101.325 kPa, oxygen concentration: approximately 20 vol %) at a temperature of 1600° C., and the firing time was 6 hours.

Processing and Surface Treatment

The resulting rare earth aluminate sintered compact was cut to an appropriate shape and size using a wire saw, after which the surface of the cut component was polished using a plane grinder. Finally, a rare earth aluminate sintered compact having a plate thickness of 230 µm was obtained as Example 1.

Example 2

A rare earth aluminate sintered compact of Example 2 was obtained in the same manner as in Example 1 with the exception that the lutetium oxide particles, aluminum oxide particles, and cerium oxide particles shown in Table 1 were used, and the firing temperature was set to 1650° C.

Example 3

A rare earth aluminate sintered compact of Example 3 was obtained in the same manner as in Example 1 with the exception that: (i) the lutetium oxide particles, aluminum oxide particles, cerium oxide particles, and LAG phosphor particles shown in Table 1 were used; (ii) an amount of 30 mass % of the LAG phosphor particles was used with respect to the total of 100 mass % of the lutetium oxide particles, aluminum oxide particles, cerium oxide particles, and LAG phosphor particles; and (iii) the firing temperature was set to 1510° C. The specific surface area of the LAG phosphor particles measured by the BET method was 8.8 $m^2/g$.

Example 4

A rare earth aluminate sintered compact of Example 4 was obtained in the same manner as in Example 1 with the exception that: (i) the lutetium oxide particles, aluminum oxide particles, cerium oxide particles, and LAG phosphor particles shown in Table 1 were used; (ii) an amount of 30 mass % of the LAG phosphor particles was used with respect to the total of 100 mass % of the lutetium oxide particles, aluminum oxide particles, cerium oxide particles, and LAG phosphor particles; and (iii) the firing temperature was set to 1530° C.

Comparative Example 1

A rare earth aluminate sintered compact of Comparative Example 1 was obtained in the same manner as in Example 1 with the exception that: (i) lutetium oxide particles having a specific surface area of 3.5 $m^2/g$ measured by the BET method, aluminum oxide particles having a specific surface area of 5.5 $m^2/g$ measured by the BET method, and cerium oxide particles having a specific surface area of 125 $m^2/g$ measured by the BET method were used; and (ii) the firing temperature was set to 1700° C.

Comparative Example 2

A rare earth aluminate sintered compact of Comparative Example 2 was obtained in the same manner as in Comparative Example 1 with the exception that the firing temperature was set to 1680° C.

Comparative Example 3

A rare earth aluminate sintered compact of Comparative Example 3 was obtained in the same manner as in Comparative Example 1 with the exception that the firing temperature was set to 1660° C.

Example 5

A rare earth aluminate sintered compact was obtained in the same manner as in Example 1 with the exception that: (i) yttrium oxide particles having a specific surface area of 20 $m^2/g$ measured by the BET method, aluminum oxide particles having a specific surface area of 5.5 $m^2/g$ measured by the BET method, and cerium oxide particles having a specific surface area of 125 $m^2/g$ measured by the BET method were weighed and used to form a composition with which the molar ratio of each element of Y, Al, and Ce included in the oxide particles was expressed by $Y_{2.99}Ce_{0.01}Al_{5.1}O_{12}$; (ii) 6 parts by mass of a dispersant was added to 100 parts by mass of the total amount of the yttrium oxide particles, aluminum oxide particles, and cerium oxide particles, and 50 parts by mass of ethanol was further added to provide the raw material mixture; and (iii) the firing temperature was set to 1570° C.

Example 6

A rare earth aluminate sintered compact of Example 6 was obtained in the same manner as in Example 5 with the exception that the firing temperature was set to 1580° C.

Example 7

A rare earth aluminate sintered compact of Example 7 was obtained in the same manner as in Example 5 with the exception that the firing temperature was set to 1600° C.

Example 8

A rare earth aluminate sintered compact of Example 8 was obtained in the same manner as in Example 5 with the exception that: (i) the yttrium oxide particles, aluminum oxide particles, cerium oxide particles, and YAG phosphor particles shown in Table 2 were used; (ii) an amount of 30 mass % of the YAG phosphor particles was used with respect to the total of 100 mass % of the yttrium oxide particles, aluminum oxide particles, cerium oxide particles, and YAG phosphor particles; and (iii) the firing temperature was set to 1540° C. The specific surface area of the YAG phosphor particles measured by the BET method was 8.0 $m^2/g$.

Comparative Example 4

A rare earth aluminate sintered compact of Comparative Example 4 was obtained in the same manner as in Example 1 with the exception that: (i) yttrium oxide particles having a specific surface area of 2.1 $m^2/g$ measured by the BET method, aluminum oxide particles having a specific surface area of 5.5 $m^2/g$ measured by the BET method, and cerium oxide particles having a specific surface area of 125 $m^2/g$ measured by the BET method were used; and (ii) the firing temperature was set to 1640° C.

Comparative Example 5

A rare earth aluminate sintered compact of Comparative Example 4 was obtained in the same manner as in Example 1 with the exception that the firing temperature was set to 1650° C.

Each of the rare earth aluminate sintered compacts of the examples and comparative examples was subjected to the following analysis. The results are shown in Tables 1 and 2 and described below.

Relative Density

The relative density of each of the rare earth aluminate sintered compacts of the examples and comparative examples was measured. The relative density of each rare earth aluminate sintered compact of the examples and the comparative examples was calculated according to formula (1) described above. The apparent density of each rare earth aluminate sintered compact was calculated from formula (2) described above. As the true density of each rare earth aluminate sintered compact, the true density of the LAG phosphor or the true density of the YAG phosphor was used. The true density of the LAG phosphor was 6.69 g/cm$^3$. The true density of the YAG phosphor was 4.60 g/cm$^3$.

Relative Luminous Flux (%)

A laser beam having a wavelength of 450 nm was irradiated from a laser diode and made incident on the rare earth aluminate sintered compact of each example and comparative example so that the light diameter of the incident light was 2.2 mm, and the radiant flux of light exiting from the same surface as the surface on which the laser beam was incident was measured using an integrating sphere. With the radiant flux of Comparative Example 1 considered to be 100%, the radiant fluxes obtained by measuring a sample of each of the rare earth aluminate sintered compacts of Examples 1 to 4 and Comparative Examples 2 and 3 with respect to the radiant flux of Comparative Example 1 were expressed as a relative luminous flux (%). In addition, with the radiant flux of Comparative Example 4 considered to be 100%, the radiant fluxes obtained by measuring a sample of each of the rare earth aluminate sintered compacts of Examples 5 to 8 and Comparative Example 5 with respect to the radiant flux of Comparative Example 4 were expressed as a relative luminous flux (%).

Light Diameter Ratio ((Light Diameter of Exiting Light)/ (Light Diameter of Incident Light))

A laser beam having a wavelength of 450 nm was irradiated from a laser diode onto the rare earth aluminate sintered compact of each example and comparative example so that the light diameter of the incident light was 0.6 mm on a first main surface on which the laser beam was incident, and the light diameter of the laser beam was defined as the light diameter of the light incident on the first main surface of the rare earth aluminate sintered compact. To obtain the light diameter of light exiting from the same surface as the first main surface on which the laser beam was incident, (i) a color luminance meter was used to measure the luminance of light exiting from the rare earth aluminate sintered compact of each example and comparative example, (ii) a position at which the maximum luminance in the obtained light emission spectrum was exhibited was determined and used as a center (measurement center), (iii) the distances (mm) from the measurement center, of two positions at which the luminance (30/100 luminance) became 30/100 of the maximum luminance in the light emission spectrum were measured as absolute values, (iv) the sum of the absolute values of the distances (mm) from the measurement center, of the two positions at which the luminance became 30/100 of the maximum luminance was measured, and (v) the measured value thereof was used as the light diameter of the light exiting from the first main surface. The light diameter ratio of the light diameter of the light exiting from the first main surface to the light diameter of the light incident on the first main surface, which is identical to the surface to which the light enters, was determined. With the light diameter ratio of Comparative Example 1 being 100%, the light diameter ratios obtained by measuring a sample of each of the rare earth aluminate sintered compacts of Examples 1 to 4 and Comparative Examples 2 and 3 with respect to the light diameter ratio of Comparative Example 1 were expressed as a relative light diameter ratio (%). In addition, with the light diameter ratio of Comparative Example 4 being 100%, the light diameter ratios obtained by measuring a sample of each of the rare earth aluminate sintered compacts of Examples 5 to 8 and Comparative Example 5 with respect to the light diameter ratio of Comparative Example 4 were expressed as relative light diameter ratios (%).

Light Extraction Efficiency (%)

The light extraction efficiency (%) for each of the rare earth aluminate sintered compacts of the examples and comparative examples was calculated by dividing the measured relative luminous flux divided by the relative light diameter ratio.

Method for Measuring Absolute Maximum Length

In scanning electron microscope (SEM) images obtained by photographing the surface or cross section of each of the rare earth aluminate sintered compacts of the examples and comparative examples using a scanning electron microscope, a region having a surface area of 12096 μm$^2$ was used as the measurement range. Here, the vertical by horizontal data size of each SEM image was vertical×horizontal=1280×960 pixels, and one pixel was 0.09921875 μm, and therefore the surface area of the measurement range was calculated as 127 μm×95.25 μm for a result of 12096 μm$^2$. The distance between the two farthest points on a contour of one rare earth aluminate phosphor crystal phase or one void included in this measurement range was measured as the absolute maximum length of the one rare earth aluminate phosphor crystal phase or the absolute maximum length of the one void using a Winroof2018 image analysis software device (available from Mitani Corporation). A number distribution of absolute maximum lengths of individual rare earth aluminate phosphor crystalline phases included in the measurement range was determined, and a ratio of the number of rare earth aluminate phosphor crystalline phases having an absolute maximum length in a range from 0.4 μm to 1.3 μm with respect to the total number of rare earth aluminate phosphor crystalline phases was determined. Furthermore, a number distribution of absolute maximum lengths of the voids included in the measurement range was determined, and for each of the rare earth aluminate sintered compacts of Examples 1 to 4 and Comparative Examples 1 to 3, a ratio of the number of voids having an absolute maximum length in a range from 0.1 μm to 1.2 μm to the total number of voids was determined. A number distribution of absolute maximum lengths of the voids included in the measurement range was determined, and for each of the rare earth aluminate sintered compacts of Examples 5 to 8 and Comparative Examples 4 and 5, the ratio of the number of voids having an absolute maximum length in a range from 0.1 μm to 1.2 μm to the total number of voids was determined. In addition, the absolute maximum length (μm) at a cumulative frequency of 50%, the minimum value (μm) of the absolute maximum length, and the maximum value (km) of the absolute maximum length were determined from the number particle size distribution of absolute maximum lengths of the rare earth aluminate phosphor crystalline phases. The absolute maximum length (km) at a cumulative frequency of 50%, the minimum value (km) of the absolute maximum length, and the maximum value (km) of the absolute maximum length were determined in a number frequency particle size distribution of the absolute maximum length of the voids.

SEM Image

A scanning electron microscope (SEM) was used to obtain SEM images of the surface of each rare earth aluminate sintered compact of the examples and comparative examples. Note that the SEM images shown in the drawing were obtained at a magnification of 2000 times, and the SEM images used to measure the absolute maximum lengths were obtained at a magnification of 1000 times in consideration of the accuracy of the analysis.

TABLE 1

| | Raw Material | | | | | Rare Earth Aluminate Sintered Compact | | | | |
|---|---|---|---|---|---|---|---|---|---|---|
| | Specific Surface Area ($m^2/g$) | | | LAG Phosphor Particles (%) | Phosphor particles/ raw material Mixture (mass %) | Firing Temperature (%) | Relative Density (%) | Relative Luminous Flux (%) | Relative Light Diameter Ratio (%) | Light Extraction Efficiency (Luminous Flux/Light Diameter Ratio) (%) |
| | $Lu_2O_3$ | $Al_2O_3$ | $CeO_2$ | | | | | | | |
| Example 1 | 12 | 11.8 | 125 | — | — | 1600 | 95.7 | 94.2 | 77.7 | 1.21 |
| Example 2 | | | | — | — | 1650 | 97.4 | 100.8 | 86.6 | 1.16 |
| Example 3 | | | | 8.8 | 30 | 1510 | 97.0 | 101.6 | 84.2 | 1.21 |
| Example 4 | | | | | | 1530 | 98.0 | 105.8 | 93.3 | 1.13 |
| Comparative Example 1 | 3.5 | 5.5 | 125 | — | — | 1700 | 98.2 | 100.0 | 100.0 | 1.00 |
| Comparative Example 2 | | | | | | 1680 | 97.3 | 96.7 | 99.3 | 0.97 |
| Comparative Example 3 | | | | | | 1660 | 93.5 | 87.5 | 78.8 | 1.11 |

| | Rare Earth Aluminate Sintered Compact | | | | | | | |
|---|---|---|---|---|---|---|---|---|
| | Phosphor Crystalline Phase Absolute Maximum Length | | | | Voids Absolute Maximum Length | | | |
| | Number (%) 0.4-1.3 µm | Cumulative Frequency 50% (µm) | Minimum Value (µm) | Maximum Value (µm) | Number (%) 0.1-1.2 µm | Cumulative Frequency 50% (µm) | Minimum Value (µm) | Maximum Value (µm) |
| Example 1 | 97.7 | 0.8 | 0.45 | 2.26 | 98.1 | 0.6 | 0.48 | 2.22 |
| Example 2 | 92.6 | 0.9 | 0.59 | 2.16 | 94.2 | 0.8 | 0.31 | 1.21 |
| Example 3 | 98.3 | 0.7 | 0.45 | 2.14 | 100.0 | 0.4 | 0.25 | 0.84 |
| Example 4 | 97.9 | 0.7 | 0.45 | 2.11 | 100.0 | 0.5 | 0.25 | 1.04 |
| Comparative Example 1 | 67.4 | 1.2 | 0.68 | 4.20 | 70.6 | 1.0 | 0.58 | 2.49 |
| Comparative Example 2 | 65.6 | 1.2 | 0.65 | 3.72 | 77.6 | 1.0 | 0.62 | 2.69 |
| Comparative Example 3 | 72.5 | 1.1 | 0.65 | 3.33 | 85.9 | 0.9 | 0.55 | 1.82 |

TABLE 2

| | Raw Material | | | | | Rare Earth Aluminate Sintered Compact | | | | |
|---|---|---|---|---|---|---|---|---|---|---|
| | Specific Surface Area ($m^2/g$) | | | YAG Phosphor Particles (%) | Phosphor particles/ raw material Mixture (mass %) | Firing Temperature (%) | Relative Density (%) | Relative Luminous Flux (%) | Relative Light Diameter Ratio (%) | Light Extraction Efficiency (Luminous Flux/Light Diameter Ratio) (%) |
| | $Y_2O_3$ | $Al_2O_3$ | $CeO_2$ | | | | | | | |
| Example 5 | 20 | 5.5 | 125 | — | — | 1570 | 95.2 | 100.0 | 91.5 | 1.09 |
| Example 6 | | | | | | 1580 | 95.8 | 104.0 | 95.1 | 1.09 |

TABLE 2-continued

| | | | | | | | | | |
|---|---|---|---|---|---|---|---|---|---|
| Example 7 | | | | 8.0 | 30 | 1600 | 97.0 | 108.0 | 107.3 | 1.01 |
| Example 8 | | | | | | 1540 | 97.1 | 103.2 | 98.8 | 1.04 |
| Comparative Example 4 | 2.1 | 5.5 | 125 | — | — | 1640 | 95.3 | 100.0 | 100.0 | 1.00 |
| Comparative Example 5 | | | | | | 1650 | 96.3 | 101.6 | 106.1 | 0.96 |

| | Rare Earth Aluminate Sintered Compact | | | | | | | |
|---|---|---|---|---|---|---|---|---|
| | Phosphor Crystalline Phase Absolute Maximum Length | | | | Voids Absolute Maximum Length | | | |
| | Number (%) 0.4-1.3 μm | Cumulative Frequency 50% (μm) | Minimum Value (μm) | Maximum Value (μm) | Number (%) 0.1-1.2 μm | Cumulative Frequency 50% (μm) | Minimum Value (μm) | Maximum Value (μm) |
| Example 5 | 95.5 | 0.8 | 0.42 | 2.01 | 94.7 | 0.8 | 0.48 | 2.97 |
| Example 6 | 93.0 | 0.9 | 0.42 | 2.08 | 97.6 | 0.7 | 0.47 | 1.89 |
| Example 7 | 92.4 | 0.9 | 0.42 | 2.03 | 94.3 | 0.8 | 0.46 | 2.16 |
| Example 8 | 98.1 | 0.8 | 0.42 | 1.70 | 96.8 | 0.8 | 0.46 | 2.57 |
| Comparative Example 4 | 78.2 | 1.0 | 0.42 | 3.48 | 87.3 | 1.0 | 0.46 | 3.68 |
| Comparative Example 5 | 66.3 | 1.1 | 0.42 | 3.76 | 87.9 | 0.9 | 0.48 | 2.58 |

With each of the rare earth aluminate sintered compacts according to Examples 1 to 4, the number of rare earth aluminate phosphor crystalline phases having an absolute maximum length in a range from 0.4 μm to 1.3 μm was 90% or more relative to the total number of rare earth aluminate phosphor crystalline phases contained in the measurement range. In addition, with each of the rare earth aluminate sintered compacts according to Examples 1 to 8, the number of voids having an absolute maximum length in a range from 0.1 μm to 1.2 μm was 90% or more of the total number of voids included in the measurement range. With each of the rare earth aluminate sintered compacts of Examples 1 to 4, the relative light diameter ratio was 95% or less, the light diameter ratio was smaller than that of the rare earth aluminate sintered compact of Comparative Example 1, and the spread of exiting light was suppressed. In addition, the relative luminous flux of each of the rare earth aluminate sintered compacts of Examples 2 to 4 was higher than that of the rare earth aluminate sintered compact of Comparative Example 1. The rare earth aluminate sintered compacts according to Examples 1 to 4 exhibited higher light extraction efficiency than the rare earth aluminate sintered compact of Comparative Example 1. The relative luminous flux exits from the same surface as the surface on which the light of the rare earth aluminate sintered compact was incident, and light that was spread was also measured. The relative luminous flux of the rare earth aluminate sintered compact according to Example 1 was lower than that of the rare earth aluminate sintered compact of Comparative Example 1, but the light extraction efficiency with consideration of luminous flux per unit area was considerably higher than that of Comparative Example 1.

With each of the rare earth aluminate sintered compacts according to Examples 5 to 8, the number of rare earth aluminate phosphor crystalline phases having an absolute maximum length in a range from 0.4 μm to 1.3 μm was 90% or greater relative to the total number of rare earth aluminate phosphor crystalline phases contained in the measurement range. In addition, with each of the rare earth aluminate sintered compacts according to Examples 5 to 8, the number of voids having an absolute maximum length in a range from 0.1 μm to 1.2 μm was 90% or greater relative to the total number of voids included in the measurement range. The relative light diameter ratio of each of the rare earth aluminate sintered compacts of Examples 5, 6, and 8 was smaller than the relative light diameter ratio of the rare earth aluminate sintered compact according to Comparative Example 4, and the spread of the exiting light was suppressed. In addition, the relative luminous flux of each of the rare earth aluminate phosphors according to Examples 5 to 8 was equivalent to or higher than the rare earth aluminate sintered compact of Comparative Example 4. Each of the rare earth aluminate sintered compacts of Examples 5 to 8 exhibited a higher light extraction efficiency than the light extraction efficiency of the rare earth aluminate sintered compact of Comparative Example 4. The rare earth aluminate sintered compact of Example 5 exhibited a relative luminous flux substantially equivalent to the relative luminous flux of the rare earth aluminate sintered compact of Comparative Example 4, but the light extraction efficiency with consideration of luminous flux per unit area was higher than that of the rare earth aluminate sintered compact of Comparative Example 4.

Figure 6:
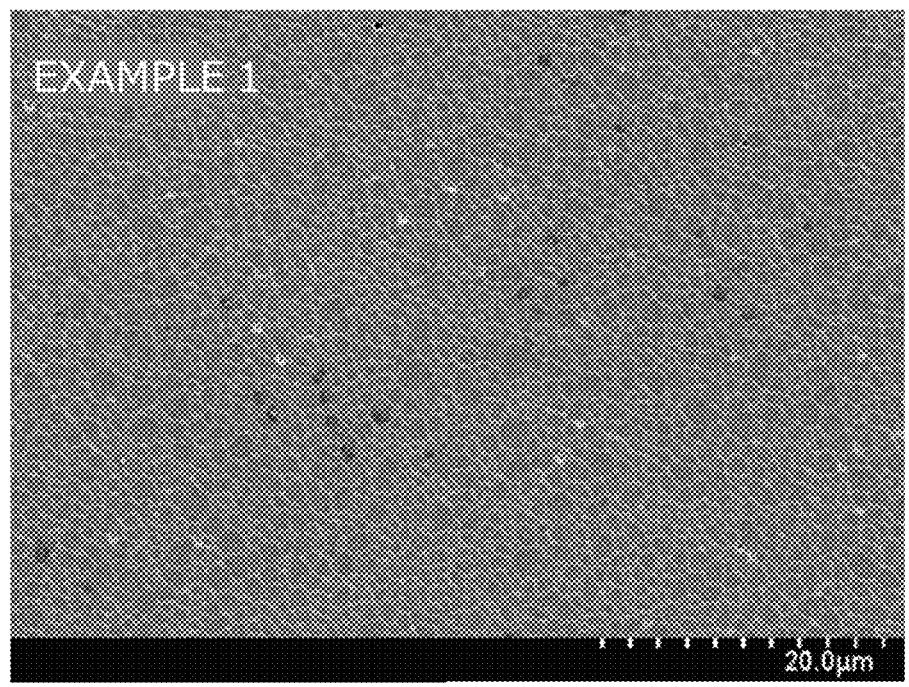
FIG. 6 is a scanning electron microscope (SEM) image of a rare earth aluminate sintered compact according to Example 1.
Figure 7:
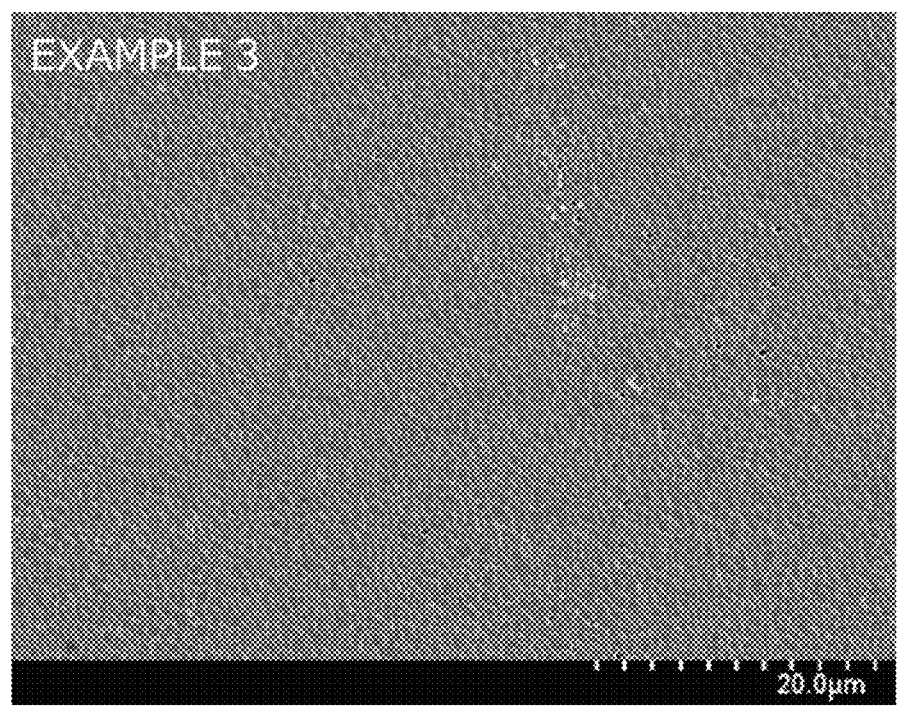
FIG. 7 is an SEM image of a rare earth aluminate sintered compact according to Example 3.
Figure 10:
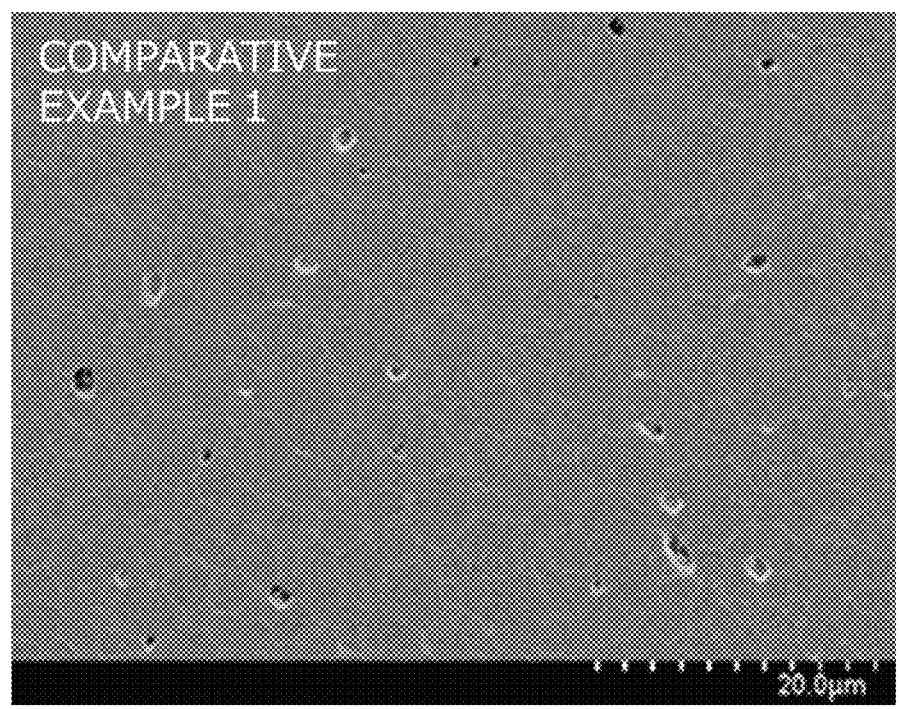
FIG. 10 is an SEM image of a rare earth aluminate sintered compact according to Comparative Example 1.

FIG. 6 is an SEM image of the surface of the rare earth aluminate sintered compact according to Example 1, and FIG. 7 is an SEM image of the rare earth aluminate sintered compact according to Example 3. FIG. 10 is an SEM image of the surface of the rare earth aluminate sintered compact according to Comparative Example 1. The rare earth aluminate sintered compacts according to Examples 1 and 3 were confirmed to have smaller individual rare earth aluminate phosphor crystalline phases compared to those of the rare earth aluminate sintered compact of Comparative Example 1. It was also confirmed that the rare earth aluminate phosphor crystalline phases of the rare earth aluminate sintered compact according to Example 3 were smaller than the rare earth aluminate phosphor crystalline phases of the rare earth aluminate sintered compact according to Example 1, and that the rare earth aluminate phosphor crystalline phases of the rare earth aluminate sintered compact in which rare earth aluminate phosphor particles were used as raw materials became smaller.

Figure 8:
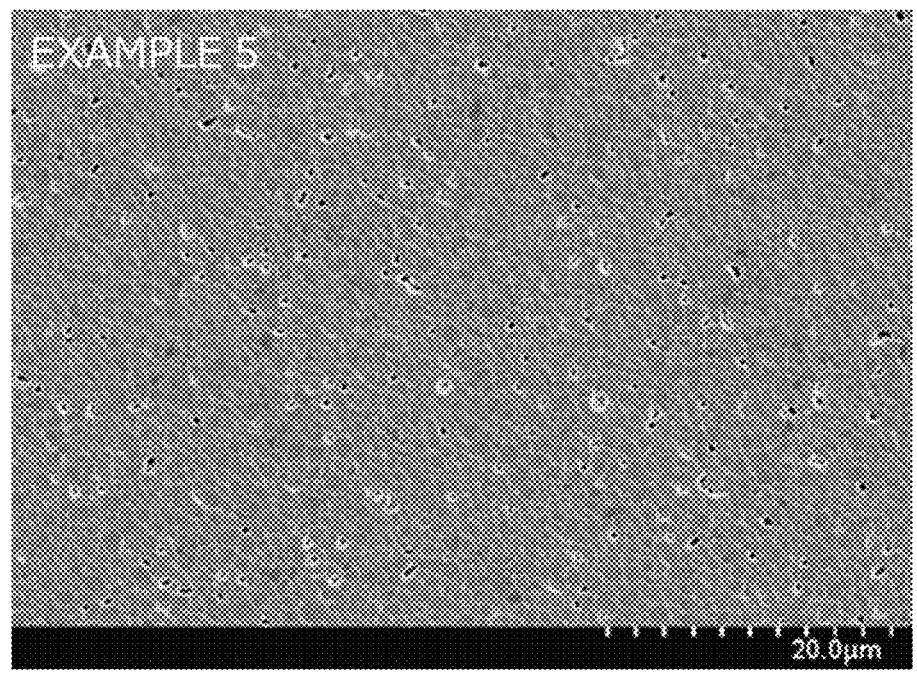
FIG. 8 is an SEM image of a rare earth aluminate sintered compact according to Example 5.
Figure 9:
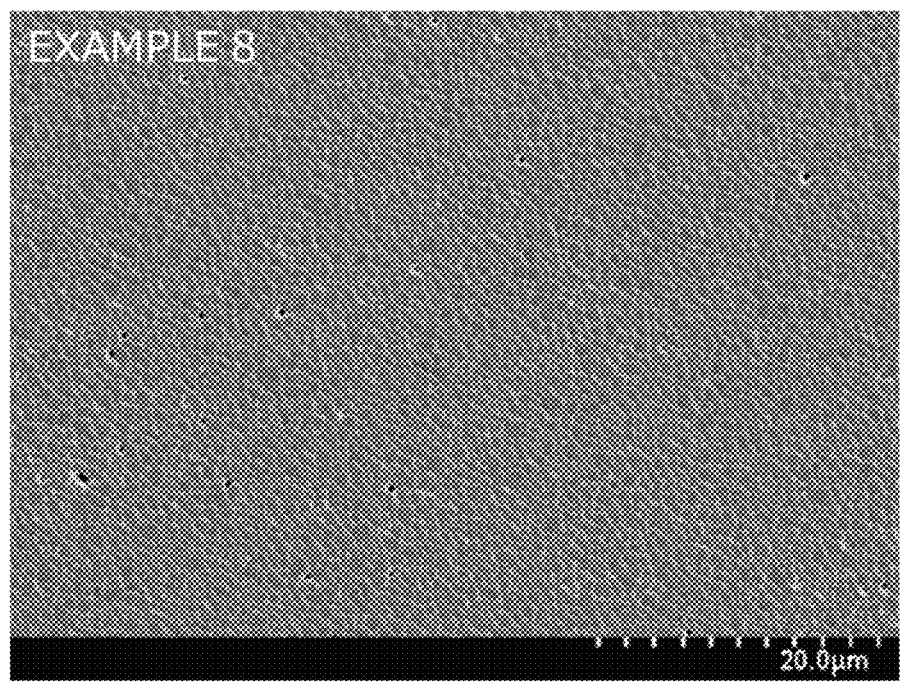
FIG. 9 is an SEM image of a rare earth aluminate sintered compact according to Example 8.
Figure 11:
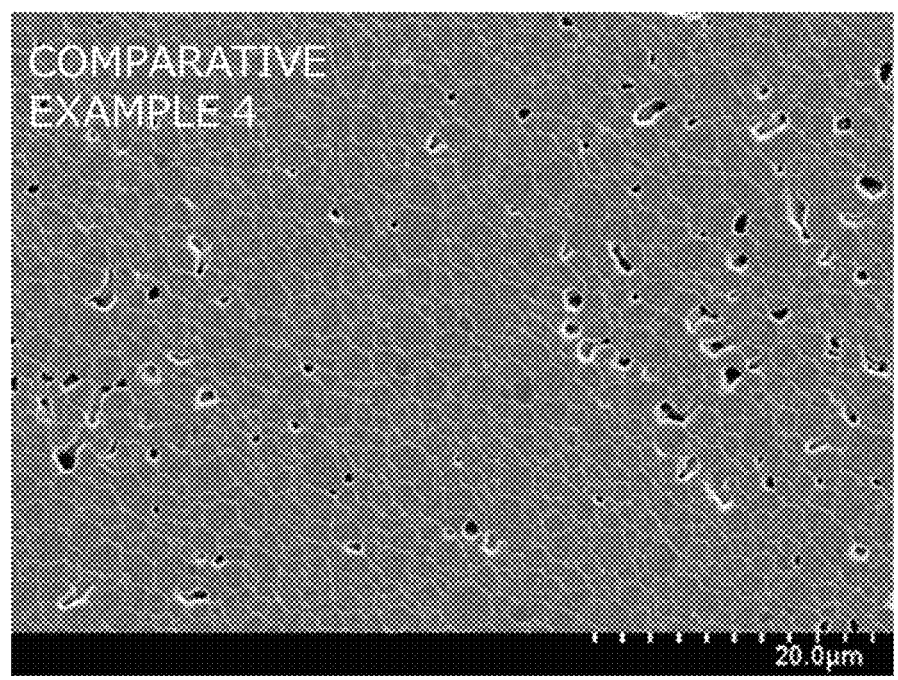
FIG. 11 is an SEM image of a rare earth aluminate sintered compact according to Comparative Example 4.

FIG. 8 is an SEM image of the surface of the rare earth aluminate sintered compact according to Example 5, and FIG. 9 is an SEM image of the rare earth aluminate sintered compact according to Example 8. FIG. 11 is an SEM image of the surface of the rare earth aluminate sintered compact of Comparative Example 4. The rare earth aluminate sintered compacts according to Examples 5 and 8 were confirmed to have smaller individual rare earth aluminate phosphor crystalline phases compared to those of the rare earth aluminate sintered compact of Comparative Example 4. It was also confirmed that the rare earth aluminate phosphor crystalline phases of the rare earth aluminate sintered compact according to Example 8 were smaller than the rare earth aluminate phosphor crystalline phases of the rare earth aluminate sintered compact according to Example 5, and that the rare earth aluminate phosphor crystalline phases of the rare earth aluminate sintered compact in which rare earth aluminate phosphor particles were used as raw materials became smaller.

The rare earth aluminate sintered compact according to the present disclosure can be combined with an excitation light source and used as a lighting device for use in a vehicle or in general lighting, a backlight for a liquid crystal display, and as a wavelength conversion member of a light source for a projector.

What is claimed is:

1. A rare earth aluminate sintered compact comprising a plurality of rare earth aluminate phosphor crystalline phases and a plurality of voids, wherein
    an absolute maximum length of 90% or more by number of the rare earth aluminate phosphor crystalline phases is in a range from 0.4 μm to 1.3 μm, and
    an absolute maximum length of 90% or more by number of the voids is in a range from 0.1 μm to 1.2 μm,
wherein a distance between two farthest points on a contour of one of the rare earth aluminate phosphor crystalline phases or the voids included in a measurement range on a surface or cross section of the rare earth aluminate sintered compact is defined as the absolute maximum length of the one of the rare earth aluminate phosphor crystalline phases or the voids.

2. The rare earth aluminate sintered compact according to claim 1, wherein in a scanning electron microscope (SEM) image obtained by photographing the surface or the cross section of the rare earth aluminate sintered compact using a scanning electron microscope, a region having a surface area of 12096 μm² is set as the measurement range.

3. The rare earth aluminate sintered compact according to claim 1, wherein an absolute maximum length at a cumulative frequency of 50% in a number particle size distribution of the absolute maximum lengths of the rare earth aluminate phosphor crystalline phases is in a range from 0.4 μm to 0.9 μm.

4. The rare earth aluminate sintered compact according to claim 1, consisting of the rare earth aluminate phosphor crystalline phases and the voids.

5. The rare earth aluminate sintered compact according to claim 1, wherein an absolute maximum length at a cumulative frequency of 50% in a number particle size distribution of the absolute maximum lengths of the voids is in a range from 0.3 μm to 0.8 μm.

6. The rare earth aluminate sintered compact according to claim 1, wherein the rare earth aluminate phosphor crystalline phases have a composition represented by Formula (I):

$$(Ln^1_{1-n}Ce_n)_3(Al_{1-m}M^1_m)_{5k}O_{12} \quad (I)$$

in Formula (I), $Ln^1$ is at least one element selected from the group consisting of Y, La, Lu, Gd, and Tb; $M^1$ is at least one element selected from the group consisting of Ga and Sc; and m, n, and k satisfy 0≤m≤0.02, 0.002≤n≤0.017, and 0.95≤k≤1.05, respectively.

7. The rare earth aluminate sintered compact according to claim 1, wherein the rare earth aluminate phosphor crystalline phases comprise Lu, and an absolute maximum length of at least one of the rare earth aluminate phosphor crystalline phases is in a range from 0.4 μm to 2.3 μm.

8. The rare earth aluminate sintered compact according to claim 1, wherein the rare earth aluminate phosphor crystalline phases comprise Lu, and an absolute maximum length of at least one of the voids is in a range from 0.1 μm to 2.3 μm.

9. The rare earth aluminate sintered compact according to claim 1, wherein the rare earth aluminate phosphor crystalline phases comprise Y, and an absolute maximum length of at least one of the rare earth aluminate phosphor crystalline phases is in a range from 0.4 μm to 2.1 μm.

10. The rare earth aluminate sintered compact according to claim 1, wherein the rare earth aluminate phosphor crystalline phases comprise Y, and an absolute maximum length of at least one of the voids is in a range from 0.1 μm to 3.0 μm.

11. The rare earth aluminate sintered compact according to claim 1, wherein the rare earth aluminate phosphor crystalline phases comprise Lu, and an absolute maximum length of each of the rare earth aluminate phosphor crystalline phases is in a range from 0.4 μm to 2.3 μm.

12. The rare earth aluminate sintered compact according to claim 1, wherein the rare earth aluminate phosphor crystalline phases comprise Lu, and an absolute maximum length of each of the voids is in a range from 0.1 μm to 2.3 μm.

13. The rare earth aluminate sintered compact according to claim 1, wherein the rare earth aluminate phosphor crystalline phases comprise Y, and an absolute maximum length of each of the rare earth aluminate phosphor crystalline phases is in a range from 0.4 μm to 2.1 μm.

14. The rare earth aluminate sintered compact according to claim 1, wherein the rare earth aluminate phosphor crystalline phases comprise Y, and an absolute maximum length of each of the voids is in a range from 0.1 μm to 3.0 μm.

* * * * *